C. L. COOK.
PACKING CASING.
APPLICATION FILED MAR. 1, 1909.
925,460.
Patented June 22, 1909.
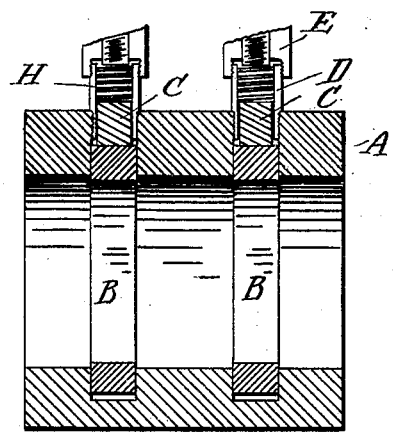
Fig. 1.
Fig. 3
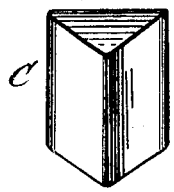
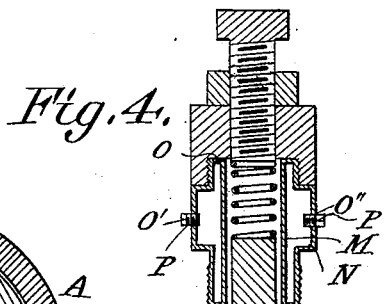
Fig. 4.
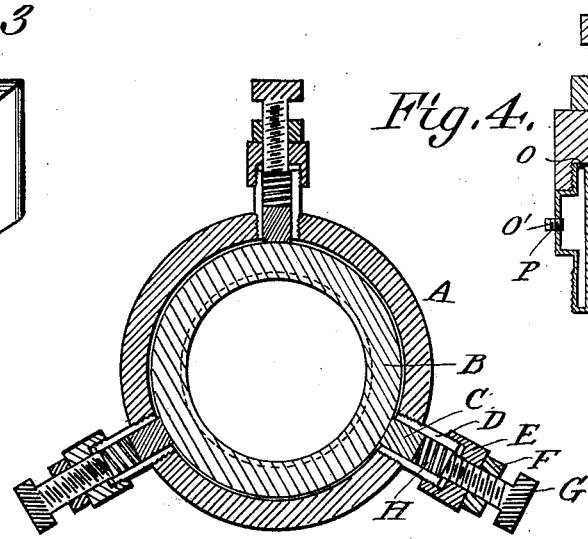
Fig. 2.
WITNESSES:
Katherine Arnett.
Charles B. Seymour
Charles Lee Cook   INVENTOR
BY
Popham & Webster
ATTORNEYS

UNITED STATES PATENT OFFICE.

CHARLES LEE COOK, OF LOUISVILLE, KENTUCKY.

PACKING-CASING.

No. 925,460.  Specification of Letters Patent.  Patented June 22, 1909.

Application filed March 1, 1909. Serial No. 480,724.

*To all whom it may concern:*

Be it known that I, CHARLES LEE COOK, a citizen of the United States, residing at Louisville, in the county of Jefferson and State of Kentucky, have invented a new and useful Packing-Casing, of which the following is a specification.

My invention relates to improvements in packing casings which contain piston rod packing rings; and the objects of my improvement are: first, to provide means for holding the rings in perfect spring balance; second, to protect the springs from the heat; third, to provide means for changing the spring mechanism readily; fourth, to do away with the necessity of contractive springs about the packing rings; and fifth, to provide means for cleaning and oiling the packing rings without removing the casing. I attain these objects by the mechanism illustrated in the accompanying drawing, in which—

Figure 1 is a longitudinal vertical section of the ring and casing; Fig. 2, a cross-section of the piston rod, packing ring, and casing, through the middle of a ring; Fig. 3, a perspective of the prismatic bearing plug; and Fig. 4, an enlarged vertical section of that form of the inserted pipe used for containing cooling fluids.

Similar letters refer to similar parts throughout the several views.

A represents an ordinary packing ring casing, adapted to hold one or more packing rings B in position about a piston rod. In the casings heretofore used, the weight of the rings B has caused them to wear more rapidly on the upper side of the piston than on the lower side. In former packing casings, there have been no appliances in the casings to contract the rings about the piston rods, nor have the casings been so constructed that the rings can be cleaned or oiled in the casing. To remedy these deficiencies, three or more openings are made in the casing above each ring, the majority of the openings being placed below the rings so that the difference between the upward and downward spring pressures may approximately equal the downward pressure of the weight of the ring. In each of these openings is inserted a pipe D, projecting outside the casing far enough to contain a coil spring H in that part which is entirely outside the casing. The reason why this coil spring is placed entirely outside the casing is because it thus escapes the destructive effects of the hot gas within the casing, the cooling of the pipe on the outside keeping the gas around the coil spring sufficiently cool. If the cooling of the pipe on the outside by the air does not keep the spring sufficiently cool, the tube D may be constructed as in Fig. 4 with an inner wall M and an outer wall N, between which water is contained as a means of keeping the spring cool. Suitable openings for injecting the water may be made at any of the points O, O', or O'', depending on the position of the pipe, said openings being closed by a plug P.

Within the pipe D, between the coil spring and the packing ring is placed the prismatic plug C, one of whose ends serves as a bearing surface upon the ring B and the other as a bearing surface for the coil spring. This plug has plane lateral faces and rounded lateral edges, the plane faces leaving room for the gas to pass freely by the plug to keep even pressure on all sides, and the rounded edges enabling the plug to slide more freely and with less wear in the pipe.

The outer end of the pipe is threaded to receive the cap E, which is centrally threaded to receive the set screw G. The set screw G is locked by the nut F. By unscrewing the cap E, the spring and plug can be taken out for cleaning or substituting new parts or for oiling the packing ring. By the use of the set screws G the spring pressure all about each ring can be adjusted so as to make it bear equally on all parts of the piston rod. This spring pressure also serves to keep the ring contracted against the piston rod and does away with the necessity of a contracting spring in or attached to the ring itself.

I claim:

1. A packing ring casing, having tubes inserted in three or more places above each ring, said tubes having coil springs within them and means for containing cooling material about said springs.

2. A packing ring casing, having tubes inserted in three or more places above each ring, said tubes having prismatic bearing plugs next to the ring extending to the outside of the casing, having coil springs outside said plugs, having means for compressing said springs, and having detachable caps.

3. A packing ring casing, having tubes inserted in three or more places above each ring, said tubes having inner and outer walls capable of containing fluid or volatile material, having prismatic bearing plugs next to the ring and extending to the outside of the casing, having coil springs outside said plugs, having means for compressing said springs, and having detachable caps.

CHARLES LEE COOK.

Witnesses:
MARGARET M. GNAEE,
ROBT. C. BALDWIN.